Patented Aug. 20, 1940

2,211,855

UNITED STATES PATENT OFFICE 2,211,855

PROCESS OF SYNTHESIZING ORGANIC COMPOUNDS

Vaman R. Kokatnur, New York, N. Y., assignor to Autoxygen Inc., New York, N. Y., a corporation of New York No Drawing. Application January 11, 1936, Serial No. 58,782. Renewed August 1, 1939

4 Claims. (Cl. 260—323)

The present invention relates to processes of organic synthesis and it particularly relates to improved processes of synthesizing organic compounds in which water and/or an acidic material are split off from one or more compounds to produce other organic compounds.

Although not restricted thereto the present invention will be particularly illustrated in connection with processes for producing dyestuffs or dyestuff intermediates, such as indigo, indigoid compounds, anthraquinone dyestuffs, such as the indanthrenes and so forth.

In the usual methods, for example, of synthesizing indigo or indigoid compounds, the amino aryl or amino phenyl carboxylic acids, or the other amine aryl or amino phenyl compounds are combined first with suitable halogenated compounds, such as halogenated carboxylic acids in the first step, and subsequently are fused in the presence of caustic alkali or sodamide in a second step to form the indoxyl compound or other intermediate indigo product which is readily convertible into the final dyestuff.

In these processes for the production of indigoid or similar compounds considerable difficulty and expense is involved in the production of the intermediates, these intermediates, for example, being phenylglycine, phenylglycine-carboxylic acid, hydroxy-ethyl-aniline, anhydroformaldehyde aniline, o-nitrobenzaldehyde, acetophenetedine and so forth. These intermediates are produced in relatively low yield and there is a simultaneous production of undesirable by-products which may be removed or eliminated only with difficulty.

Moreover, in the second or fusion step, above referred to, it is necessary to utilize a considerable excess of alkali or other expensive alkaline agents, such as caustic potash, sodamide, metallic sodium, metallic carbides, metallic cyanides and so forth.

Among the objects of the present invention are to provide an improved method of organic synthesis, particularly where water and substitution groups are to be split off in an alkali environment from one or a series of compounds in which it will be possible to carry out one or several successive reactions with the elimination of water or acid in the same reaction mixture with enhanced yield and with increased purity of the final products, all without the necessity of carrying a plurality of independent reactions to produce one or more intermediates between the initial starting material and the final product desired with intermediate separation and purification and also without the necessity of carrying out expensive and difficult alkali fusion operations.

Another object of the present invention is to provide a process of preparing indigoid compounds and other dyestuffs and their intermediates from the raw materials by a one-step process which will not involve the necessity of producing intermediate compounds with low yield and which must be purified with great expense and difficulty from undesirable by-products.

Still another object is to provide an improved process for producing indigoid and other dyestuffs and their intermediates in which it will be possible to cause the synthesis of the desired materials without the necessity of utilizing the alkali fusion involving the employment of a large excess of relatively expensive alkaline agents, such as caustic soda or potash, sodamide, metallic sodium and so forth.

Other objects will be obvious or will appear during the course of the specification.

I have found that processes of organic synthesis broadly and processes of producing indigo, indanthrene and other dyestuffs specifically may be considerably simplified and converted into one step operations by carrying out the process in the presence of an inert diluent which has a boiling point at or about the temperature at which it is desired to carry out the reaction.

Among the preferred inert liquid diluents which might be utilized are various organic solvents, which will not be affected by the reagents employed, nor by the intermediate materials formed in situ, nor by the final products which it is desired to obtain and further which will not be reactive in respect to the water or acids liberated.

Among the preferred diluents of this character are inert hydrocarbon materials having boiling points within the range from 200° C. to 350° C.

It is found most desirable to regulate the boiling point of the liquid diluent so that it will boil at about the optimum reaction temperature with its vapors carrying away the water produced during the reaction. The completion of reaction may be determined when the distillate contains the theoretical amount of water to be produced by the reaction together with such other amounts as might have been brought in by the raw materials utilized. The reaction may also be terminated short of completion by stopping the distillation before removal of all the water of the reaction.

It is found that the water produced in the reaction may be removed in this manner more readily than by dehydrating agents, such as metallic sodium, sodamide, calcium carbide, and so forth hitherto employed, with assurance that the reaction will speedily proceed to completion.

In carrying out the synthesis of indigo compounds, as for example in the production of indoxyl, the various raw materials, such as aniline or anthranilic acid and chloracetic acid are dissolved or suspended in the hydrocarbon diluent, placed in a still provided with an agitator and then heated until the necessary temperature or reaction is arrived at. The alkali or alkaline material, which does not need also to be a dehydrating material, as in prior practice, may be used in equivalent or stoichimetrical proportions or in excess up to 100% to combine with the acid liberated.

The mixture is preferably heated first in an open vessel or a still with a short head and then the distillation of the inert diluent and water is caused to take place. After the reaction has been completed, the diluent may be removed by distillation, filtration or decantation to obtain the reaction products.

In the case of the indigo synthesis, the indigoid compounds may be dissolved in water, followed by precipitation of the indigo compound by passing air through the solution. The precipitated indigo compound may be purified by again reducing and again reprecipitating or other methods of purification may be employed.

This method of reaction is also applicable broadly to other condensations involving amino compounds, particularly of aromatic nature, and other organic compounds readily condensible with said amino compounds by the action of caustic alkali and it is also particularly applicable to condensations including easily oxidizible aliphatic compounds, containing two or more carbon atoms, such as chloracetic acid, acetaldehyde, alcohol, acetone, ethylene dichloride or their derivatives and homologues.

The following examples are given by way of illustration and not by way of limitation to set forth some of the various possible embodiments of the present invention.

*Example 1*

In producing indigo, 100 kilograms of anthranilic acid, 70 kilograms of monochloracetic acid and 120 kilograms of powdered or flaked caustic soda are added to 1200 litres of a cold hydrocarbon diluent boiling between 265 and 300° C. which has previously been placed in a still.

The mixture is quickly heated with agitation to about 200° C. Then the temperature is gradually raised to about 250° C. At this point the diluent begins to vaporize and distill and the reaction mixture assumes a yellow or greenish yellow color.

With the progress of distillation, the temperature gradually rises to about 280° C. at which point the reaction is completed.

The condensate may amount to about 700 or more litres depending upon the speed of distillation and the other factors involved. At the bottom of this condensate will settle all the water evolved during the reaction.

The reaction product after separation of diluent is dissolved in water and the indoxyl compound precipitated by oxidation and purified and converted into indigo in the usual manner. The dyestuff is found to be lively in color, in fine state of subdivision and to have most satisfactory physical and tinctorial characteristics.

The reaction may be illustrated by the following equations:

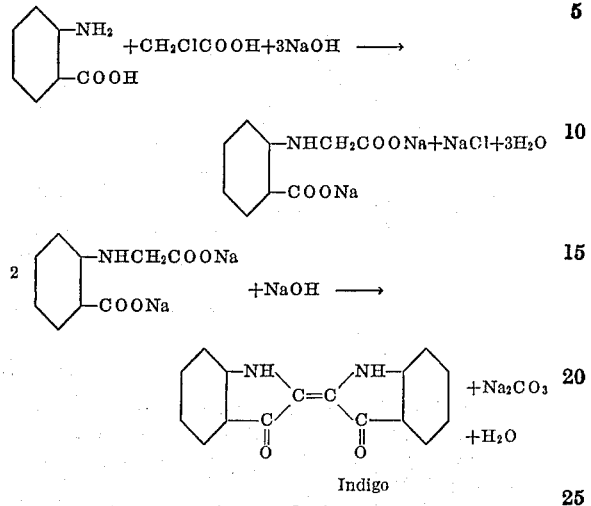

*Example 2*

In another method of preparing indoxyl, 100 kilograms of aniline, 102 kilograms of monochloracetic and 100 kilograms of caustic potash and 20 kilograms of sodamide are added to 1200 litres of a cold hydrocarbon diluent having a boiling point between 225 and 280° C. and the reaction is carried on and the product purified as in Example 1.

The following equation illustrates the reaction:

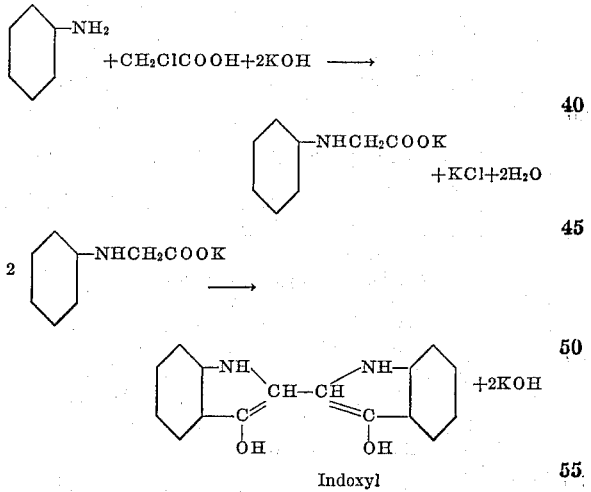

*Example 3*

As still another illustration, 100 kilograms of aniline, 86 kilograms of ethylene chlor-hydrin and 102 kilograms of a caustic mixture containing 58.5% KOH and 41.5% NaOH are reacted at about 280 to 290° C. in about 1,000 litres of a hydrocarbon diluent and the reaction product is purified as in Example 1.

*Example 4*

One gram mole of an aromatic amino compound, such as toluidin, naphthylamine, aminoanthraquinone or derivatives thereof, is reacted with about one gram mole of a partly oxidized aliphatic compound of not less than 2 carbon atoms, such as ethyl alcohol, acetaldehyde, glycerine, chlorpropane, glucose or trioxymethylene in about 10 to 20 volumes of an inert diluent boiling approximately between 200 and 310° C.

with slightly more than theoretical amount of active alkaline agent or a mixture of two or more of such alkaline agents in the manner as described in Example 1.

*Example 5*

To produce indanthrene, 244 kilograms of B-chloranthraquinone are suspended in 900 to 1,000 litres of a hydrocarbon diluent boiling between 220 and 260° C. To the mixture are added 40 to 42 kilograms of sodamide and 160 kilograms of caustic potash.

The mixture is then gradually heated to about 230° C. and held between 230 and 240° C. for about 45 minutes or until the theoretical amount of water of reaction passes over upon distillation.

The reaction mass is freed from excess diluent, dissolved in an alkaline hydrosulphide solution, crystallized, filtered or purified to obtain the desired product, Indanthrene Blue R. S. This product is a N-dihydro-1.2.5.6-anthraquinone azine.

The reaction may be illustrated by the following equations:

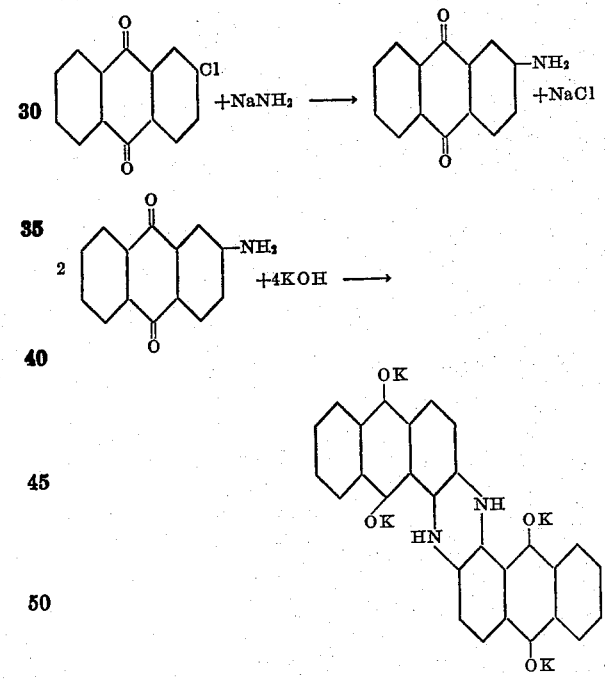

Indanthrene blue—lueco base

Similarly when one mole of anthranol and one mole of glycerine or acrolein are heated at about 235 to 250° C. with about two moles of caustic potash, Indanthrene Dark Blue B. O. or violanthrone is produced.

The term "inert" in respect to the diluent or media used is to be interpreted as sufficiently broad to include all organic or other diluents or media which will be altogether or substantially inactive in respect to the reacting materials or their products.

The term "active alkaline agent" as used embraces alkaline or alkali-earth metals, their oxides, hydroxides, sulphides and amides, singly or their mixtures. It does not include carbonates, carbides and other salts of such metals.

It is to be understood that the invention is not limited to either the examples or to the method of procedure as described in those examples. Any equivalents of the materials mentioned may be used without departing from the spirit of the invention. Similarly, the order of addition, the boiling range of the diluent, agitation and so forth may be changed to suit any individual case.

Having thus described my invention, what I claim as new and desire to secure by Letters Patent is:

1. A process of producing indigoid compounds which comprises mixing together a halo-organic compound selected from a group consisting of monochloracetic acid and ethylene chlorhydrin, with a compound capable of yielding a phenyl glycine derivative when combined with said halo-organic compound, and selected from the group consisting of aromatic amines and ortho carboxylic acid substituted aromatic amines, and subjecting the resulting mixture to caustic alkali fusion reaction for a sufficient time in the presence of an inert hydrocarbon diluent boiling between 200 and 350° C., and which is boiled and distilled progressively during the said reaction, to produce the correspondingly indoxyl compound without the isolation of intermediate phenyl glycine compounds.

2. A process of producing indigo which comprises mixing together anthra-anilic acid and monochloracetic acid and subjecting the said mixture to caustic alkali fusion reaction in the presence of an inert hydrocarbon diluent boiling between 200 and 350° C., and carrying on the reaction by progressive distillation of the diluent until the reaction is completed to produce an indoxyl compound.

3. A process of producing indigo which comprises mixing together aniline and monochloracetic acid and subjecting the said mixture to caustic alkali fusion reaction in the presence of an inert hydrocarbon diluent boiling between 200 and 350° C., and carrying on the reaction by progressive distillation of the diluent until the reaction is completed to produce an indoxyl compound.

4. A process of producing indigo which comprises mixing together an aromatic amine and ethylene chlorhydrin and subjecting the said mixture to caustic alkali fusion reaction in the presence of an inert hydrocarbon diluent boiling between 200 and 350° C., and carrying on the reaction by progressive distillation of the diluent until the reaction is completed to produce an indoxyl compound.

VAMAN R. KOKATNUR.